April 26, 1960    C. P. HOOVERSON    2,933,784
WEATHER SEAL STRUCTURE
Filed Oct. 12, 1956    3 Sheets-Sheet 1
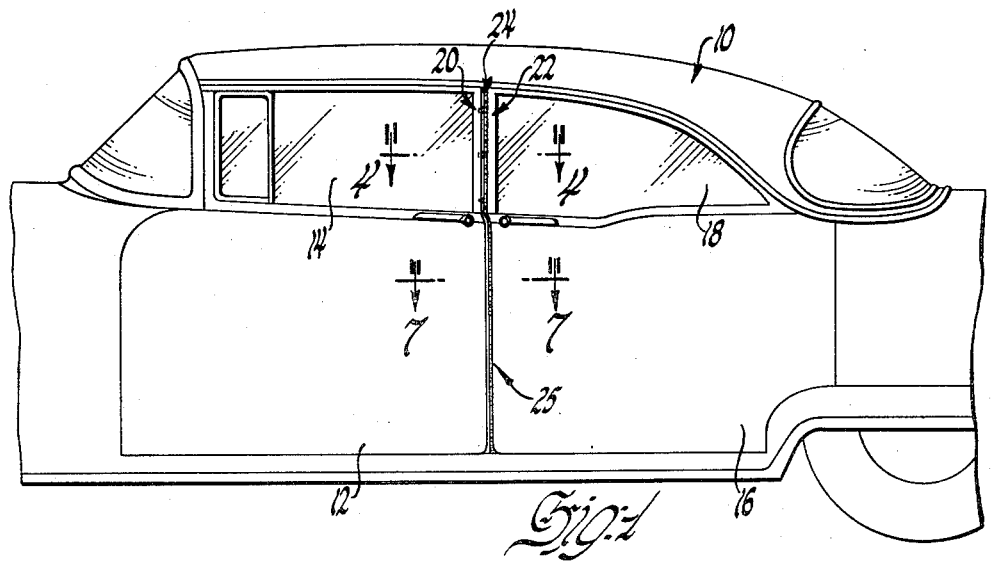
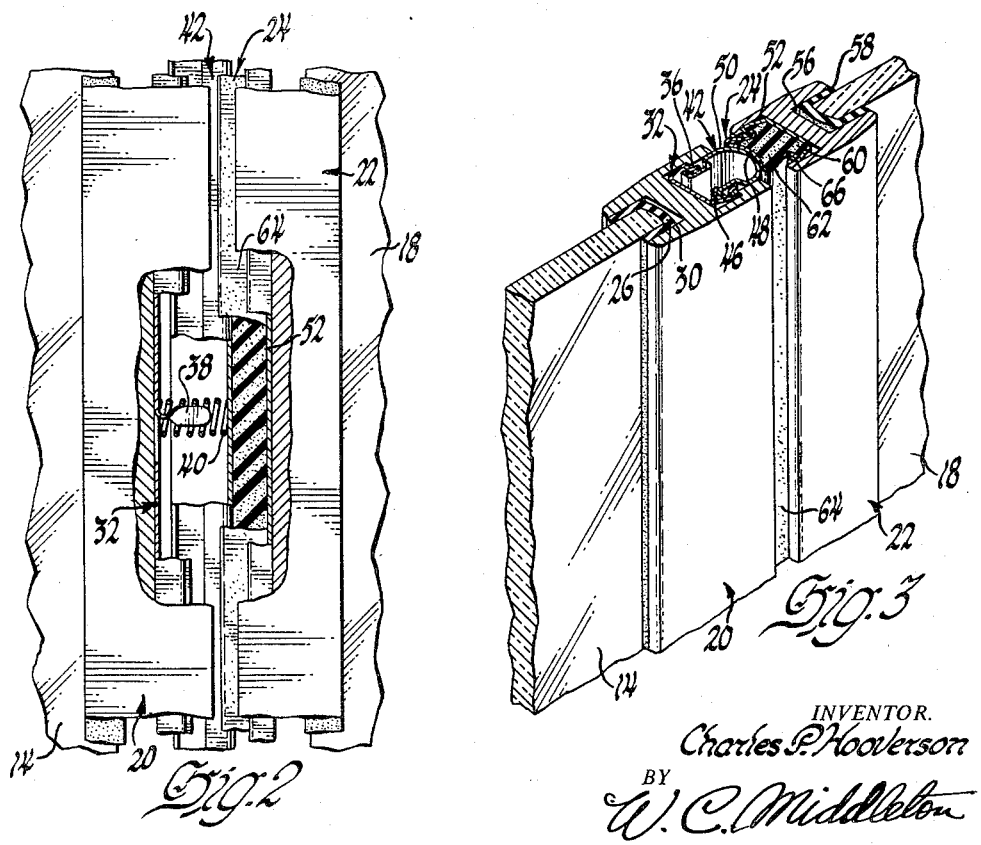
INVENTOR.
Charles P. Hooverson
BY
W. C. Middleton
ATTORNEY

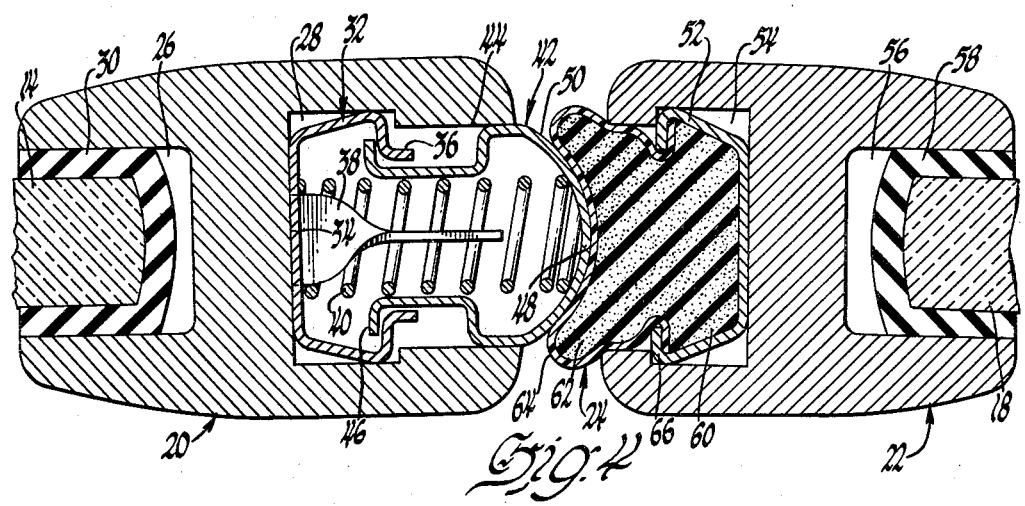

April 26, 1960   C. P. HOOVERSON   2,933,784
WEATHER SEAL STRUCTURE
Filed Oct. 12, 1956   3 Sheets-Sheet 3

INVENTOR.
Charles P. Hooverson
BY
W. C. Middleton
ATTORNEY

United States Patent Office 2,933,784
Patented Apr. 26, 1960

2,933,784

WEATHER SEAL STRUCTURE

Charles P. Hooverson, Orchard Lake, Mich., assignor to General Motors Corporation, Detroit, Mich., a corporation of Delaware Application October 12, 1956, Serial No. 615,556

2 Claims. (Cl. 20—69)

This invention relates to weather seals for closures and particularly to weather seals for vehicle bodies.

With the recent introduction of pillarless vehicle bodies, e.g., bodies of the four-door hardtop type, adequate sealing means must be provided in the space between the two raised windows formerly occupied by a center pillar or post and between the doors. For such sealing means to be satisfactory, it must be adapted to permit opening and closing of the doors as well as raising and lowering of windows whether separately or together. Furthermore, the sealing means must still remain effective despite misalignments of the related structures.

The present invention with these and other considerations in mind contemplates as a main object the provision of an effective sealing means for installation between adjacent independently movable closure members.

Furthermore, this invention seeks to provide a sealing means that is sturdy and durable; that permits without interference opening and closing of adjacent closure members; that is constructed to function properly despite misalignments of the related structures; and that may be adjusted.

The foregoing and other objects and advantages of the invention will be apparent from the following description and from the accompanying drawings, in which:

Figure 1 shows a side view of a vehicle body of the four-door hardtop type incorporating weather sealing members according to this invention.

Figure 2 is an enlarged partial sectional view of the disposition of a spring for the weather sealing members.

Figure 3 is a perspective sectional view of the weather sealing members.

Figure 4 is an enlarged sectional view along line 4—4 of Figure 1 of the weather sealing members.

Figure 5 is an enlarged sectional view similar to Figure 4 of another embodiment of the weather sealing members.

Figure 6 is an enlarged sectional view along line 6—6 of Figure 5.

Figure 7:
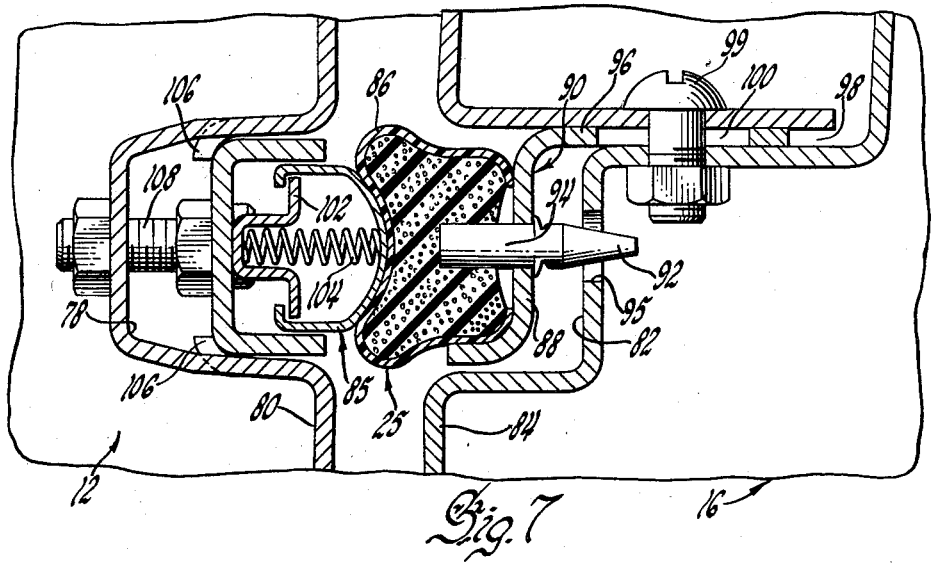
Figure 7 is an enlarged sectional view along line 7—7 of Figure 1 similar to Figure 4.

In Figure 1 an embodiment of the invention is demonstrated incorporated in a vehicle body 10 of the four-door pillarless hardtop type. The vehicle body 10 includes a front closure member as front door 12 with a window glass 14 and a rear closure member as rear door 16 with a window glass 18, both doors and windows being movable to opened and closed positions in a known manner. Each of the windows 14 and 18 have supporting structure or window frames with the front window having a rear frame member 20 and the rear window having a front frame member 22 oppositely disposed in the closed positions of the doors and windows. Above the vehicle body belt line a weather member or strip 24 is arranged between these frame members 20 and 22 and below the belt line a similar strip 25 is mounted between the edges of the doors 12 and 16.

As best shown by Figures 3 and 4 and with reference especially to Figure 4, the front window rear frame member 20 includes a forward channel 26 and a rear channel 28. The forward channel 26 fixedly receives the front door glass 14 with a suitable weather strip 30 being provided between the glass and the channel. In the rear channel 28 a retainer element 32 is suitably secured to the base of the channel at 34. This retainer element 32 comprises laterally inwardly extending arms 36 and a series of spaced tabs or spring guides 38 struck up from the base of the retainer element 32 and twisted 90° (see also Figure 2). Spring means, such as coil springs 40, fit on these tabs abutting against the base of the retainer element 32 and biasing rearwardly a rigid sealing member 42 slidable on the side walls 44 of the rear channel 28. For limiting longitudinal rearward movement of the sealing member 42, laterally outwardly extending flanges 46 are formed integral with this member to engage the arms 36 on the retainer element 32. This rigid sealing member 42 includes an arcuate sealing surface 48 and an adjacent cam surface 50 with the spring 40 continuously urging the arcuate sealing surface into sealing relation with the weather strip 24.

The weather strip 24 is retained in the rear window front frame member 22 for movement therewith by means of a clamping element 52 which is snugly received in a front channel 54 of the frame member 22. A rear channel 56 fixedly supports the rear door glass 18 with a suitable weather strip 58 being disposed between the glass and the channel. The weather strip 24, which is of some resilient material, preferably sponge rubber, includes a base portion 60 secured to the clamping element 52 and a body portion 62 of arcuate configuration, when unstressed, having a cover means 64, which may be some suitable cloth fabric. To secure this cover means 64 to the body portion 62, legs 66 of the clamping element 52 are offset inwardly over the edges of cover means. Functionally, this cover means adds rigidity to the sponge rubber of the weather strip 24 protecting it and in addition providing a sliding surface for engagement with the cam surface 50 when the doors are moved independently or together. It should be noted that the arcuate configurations of the weather strip 24 and the rigid sealing member 42 furnish a large possible sealing area, especially since the resilient strip 24 is deflectable. Consequently, a substantially large misalignment of adjacent windows and doors will not impair the effectiveness of the sealing engagement.

The operation of the Figure 4 structures may be best explained assuming the rear door 16 closed and the front door 12 moving towards its closed position with the windows raised. As the rigid sealing member 42 approaches the weather strip 24, the cam surface 50 starts to engage the cover means 64 on the body portion 62 of the weather strip commencing stress of the sponge rubber material. At this time, the springs 40 start to compress under the force of this engagement. Continued movement of the door 12 further compresses the spring 40 as well as distorts the sponge rubber material more until the weather strip 24 and the rigid sealing member 42 assume the positions depicted. As mentioned, this closing movement is aided by the inherent sliding ability of the cover means 64 and also by the shaping of the cam surface 50 of the rigid sealing member 42.

In the modification shown by Figures 5 and 6, the construction is the same as in Figure 4 with the exception of the sealing members. Referring to Figure 5, a weather strip or member 24' of the same general shape as the weather strip 24 is made of suitable resilient material with the base portion 60' clamped to a clamping element 52' suitably secured to the base of the front channel 54. This strip 24' includes a bore 68 to allow the strip to be readily flattened upon engagement with a rigid sealing member 42'. The sealing member 42' comprises an arcuate sealing surface 48' of the same configuration as the arcuate sealing surface 48 on the sealing member 42 and laterally inwardly extending flanges 70. As in the Figure 4 embodiment, these flanges 70 in limiting rearward movement of the member 42' coact with laterally outwardly extending arms 72 on a retainer element 74 secured to the base of rear channel 28. A series of flat sinuous springs 76 are attached to the retainer element 74 and bias the rigid sealing member 42' into sealing relation with the weather strip 24' in the same manner as the springs 40 in Figure 4.

Below the belt line of the body 10, as illustrated in Figure 7, a channel 78 in a face 80 of the front door 12 and a channel 82 in a face 84 of the rear door 16 are oppositely disposed with the doors closed. These channels perform as supporting structure with the weather sealing strip 25 being retained in the channel 82 and a rigid weather sealing member 85 being retained in the channel 78.

The weather strip 25, which is substantially the same as the strip 24, also includes a cover 86 over sponge rubber material. The strip 25 seats against a leg 88 of an L-shaped member 90 having a plurality of tapered pins 92 therein. The ends 94 of the pins 92 are embedded in and secured to the sponge rubber material of the strip. When the strip is installed to the door face 84, the tapered pins 92 are inserted in alignment holes 95 at the base of the channel 82 and a leg 96 of the member 90 is positioned in an opening 98 along an inboard side of the channel. A plurality of screws 99 are received in an elongated slot 100 in the member 90 and fixedly secure the member and strip to the door. Longitudinal adjustment of the sealing engagement between the strip 25 and the sealing member 84 is permitted by this slot so that an effective seal is provided despite manufacturing tolerances which vary the gap between the closed doors.

The rigid sealing member 84, which is substantially the same as member 42' shown in Figure 5, also has a retainer element 102 and a plurality of springs 104 therebetween. The retainer element 102 is suitably attached to a U-shaped channel member 104 which member is sealed against flanges 106 in the channel 78. A plurality of bolts 108 between the base of the channel 78 and the member 104 retains the member in the seated position.

Figure 8:
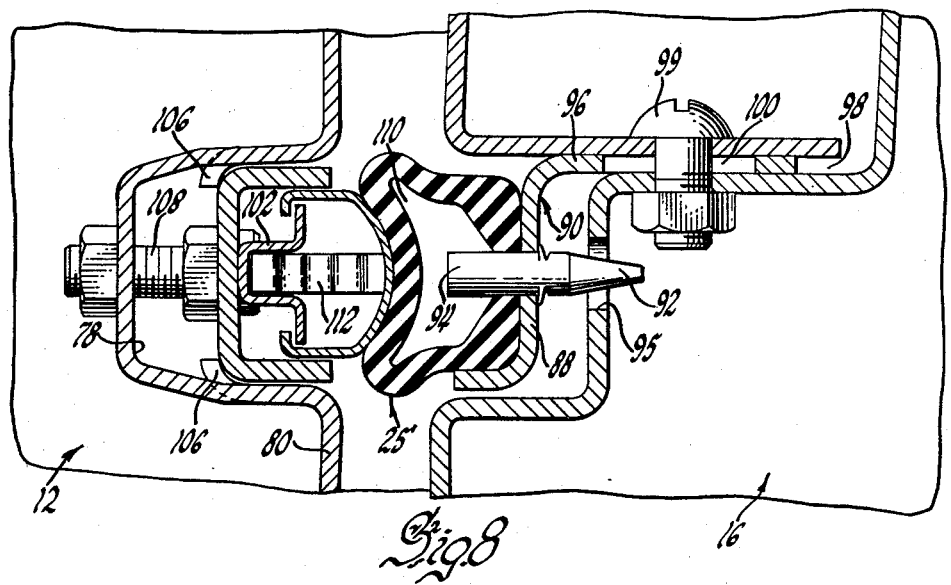
Figure 8 is an enlarged sectional view similar to Figure 7 of the weather sealing members shown in Figure 5.

The Figure 8 modification is exactly the same as the arrangement in Figure 7 except that a resilient weather sealing strip 25', like strip 24' in Figure 5, with a bore 110 for the same purpose replaces strip 25 and a series of flat sinuous springs 112, similar to springs 76 in Figure 5, replace the springs 104.

As for the operation of the below the belt line sealing arrangement in Figures 7 and 8, it is the same as previously described with reference to Figures 4 and 5.

In the vicinity of the belt line, there is a break or interruption between the window and door seals to permit movement of the windows to and from closed positions. At this break area any suitable supplemental sealing means (not shown) may be employed.

Although not limited to this arrangement the foregoing sealing members and strips are especially effective when employed with a vehicle body of the type in Figure 1 having doors swingable on spaced vertical axes. As shown, the front door 12 has a vertical hinge axis at the front and the rear door 16 has a vertical hinge axis at the rear. Misalignments occur due to variations in production tolerances and consequently, the space between the closed doors and windows vary. As mentioned, the arcuate shapes of the sealing members adjust to these variations. Also, below the belt line longitudinal adjustment between the sealing strip and the sealing member is permitted. Furthermore, with both sealing members yieldable, interference with opening and closing of the doors 12 and 16 is lessened.

I claim:
1. In a vehicle having a pair of closure members movable to and from closed positions, a seal assembly for operation therebetween comprising a frame member secured to each closure member, confronting channels having side walls and a bottom wall formed in each frame member, a rigid sealing member disposed within a first of said frame member channels, said rigid sealing member having substantial longitudinal surfaces slidably engaging said first channel side walls to prevent tilting when said rigid sealing member is moving longitudinally, flanges integral with said rigid sealing member extending laterally at the end within said first frame channel, a retainer element secured within said first frame channel, flanges integral with said retainer element extending laterally at the end remote from said bottom wall of said first channel, said retainer element flanges engaging said rigid sealing member flanges to limit outward movement thereof, spring means disposed between said rigid sealing member and said retainer element, a plurality of spaced outwardly extending tabs secured to said retainer element, said tabs having said spring means positioned thereon, a resilient sealing member having a base portion fixedly positioned within the second of said frame member channels, a cover means provided about said resilient sealing member, a clamping element having laterally extending legs to secure said cover means and retain said resilient sealing member within said second frame member channel, and an arcuate body portion integral with said resilient sealing member to be sealingly engaged and deformed by said rigid sealing member.

2. In a vehicle having a pair of closure members movable to and from closed positions, a seal assembly for operation therebetween comprising a frame member being secured to each closure member, confronting channels formed in each of said frame members, a first of said channels having inner side and bottom walls, a rigid sealing member disposed within the first of said frame member channels, said rigid sealing member having substantial longitudinal surfaces slidably engaging said first channel side inner walls, said engagement of said rigid sealing member longitudinal surfaces and said first channel side walls preventing tilting during relative sliding of said rigid sealing member, flanges integral with said rigid sealing member extending laterally at the end within said first frame member channel, a retainer element secured within said first frame channel, flanges integral with said retainer element extending laterally at the end remote from said first channel bottom wall, said retainer element flanges engaging said rigid sealing member flanges to limit outward movement thereof, spring means disposed between said rigid sealing member and said retainer element, said retainer element being deformed at its mid-portion to receive said spring means, a resilient sealing member secured to the second of said frame member channels, a plurality of spaced pins embedded in said resilient sealing member, said second frame member channel having a plurality of spaced openings to receive said sealing member pins, and a cover member secured about said resilient sealing member thereby reducing friction between said rigid sealing member and said resilient sealing member upon engagement of said sealing members.

References Cited in the file of this patent
UNITED STATES PATENTS

| 562,001 | La Flare | June 16, 1896 |
|---|---|---|
| 1,210,535 | Riley | Jan. 2, 1917 |
| 1,948,017 | Wuebling | Feb. 20, 1934 |
| 2,049,464 | Marine | Aug. 4, 1936 |
| 2,273,182 | Dodge | Feb. 17, 1942 |
| 2,372,975 | Norden | Apr. 3, 1945 |
| 2,797,958 | Podolan | July 2, 1957 |

FOREIGN PATENTS

| 567,501 | France | Dec. 7, 1923 |